US010852118B2

(12) United States Patent
Meyer et al.

(10) Patent No.: US 10,852,118 B2
(45) Date of Patent: Dec. 1, 2020

(54) EXTENSOMETER STRUCTURE

(71) Applicant: MTS Systems Corporation, Eden Prairie, MN (US)

(72) Inventors: Richard A. Meyer, Chaska, MN (US); Dustin Bonner, Plymouth, MN (US); David Yap Chua, Carver, MN (US); John Albert Christiansen, Plymouth, MN (US)

(73) Assignee: MTS SYSTEMS CORPORATION, Eden Prairie, MN (US)

( * ) Notice: Subject to any disclaimer, the term of this patent is extended or adjusted under 35 U.S.C. 154(b) by 0 days.

(21) Appl. No.: 16/208,545

(22) Filed: Dec. 3, 2018

(65) Prior Publication Data

US 2019/0178619 A1    Jun. 13, 2019

Related U.S. Application Data

(60) Provisional application No. 62/593,617, filed on Dec. 1, 2017.

(51) Int. Cl.
| | |
|---|---|
| *G01B 5/30* | (2006.01) |
| *G01B 7/16* | (2006.01) |
| *G01N 3/04* | (2006.01) |
| *G01N 3/08* | (2006.01) |

(52) U.S. Cl.
CPC .............. *G01B 5/30* (2013.01); *G01B 7/16* (2013.01); *G01N 3/04* (2013.01); *G01N 3/08* (2013.01)

(58) Field of Classification Search
CPC ... G01B 5/30; G01B 7/16; G01B 7/18; G01B 7/22

USPC .......................................................... 33/787
See application file for complete search history.

(56) References Cited

U.S. PATENT DOCUMENTS

| | | | | |
|---|---|---|---|---|
| 2,611,966 A | * | 9/1952 | Rebman ................... | G01B 5/30 33/790 |
| 3,001,291 A | * | 9/1961 | Sjostrom .................. | G01B 7/16 33/561 |
| 3,789,508 A | | 2/1974 | Meline | |
| 4,490,021 A | * | 12/1984 | Moya ..................... | H01S 3/0812 359/572 |

(Continued)

FOREIGN PATENT DOCUMENTS

DE            3714185 A1    11/1988

OTHER PUBLICATIONS

International Search Report and Written Opinion for International patent application No. PCT/US2018/063696, dated May 24, 2019.

(Continued)

*Primary Examiner* — Christopher W Fulton
(74) *Attorney, Agent, or Firm* — Steven M. Koehler; Westman, Champlin & Koehler, P.A.

(57) ABSTRACT

An extensometer structure includes a first extension arm having a first mount configured to support a first specimen engaging member and a second extension arm having a second mount configured to support a second specimen engaging member. A connecting member extends between the first and second extension arms and pivotally connects to each of the first and second extension arms between each corresponding mount and a remote end of the extension arm. A rear coupling assembly connects remote ends of the extension arms together.

49 Claims, 15 Drawing Sheets

(56) References Cited

U.S. PATENT DOCUMENTS

| | | | | |
|---|---|---|---|---|
| 4,527,335 | A * | 7/1985 | Meline | G01B 7/16 |
| | | | | 33/787 |
| 4,823,473 | A * | 4/1989 | McMahon | G01B 5/30 |
| | | | | 33/787 |
| 4,831,738 | A * | 5/1989 | Meline | G01B 7/22 |
| | | | | 33/790 |
| 4,884,456 | A * | 12/1989 | Meline | G01B 5/30 |
| | | | | 73/826 |
| 4,939,445 | A * | 7/1990 | Meline | G01B 7/22 |
| | | | | 324/663 |
| 5,119,569 | A * | 6/1992 | Meline | G01B 7/16 |
| | | | | 33/790 |
| 5,123,175 | A | 6/1992 | van der Kuur | |
| 5,454,174 | A * | 10/1995 | Lewington | G01B 5/30 |
| | | | | 33/787 |
| 5,600,895 | A * | 2/1997 | Meyer | G01B 5/30 |
| | | | | 33/789 |
| 5,712,430 | A * | 1/1998 | Meyer | G01B 5/30 |
| | | | | 33/787 |
| 6,907,677 | B1 * | 6/2005 | Hartman | G01B 7/16 |
| | | | | 33/787 |

OTHER PUBLICATIONS

Invitation to Pay Additional Fees dated Mar. 21, 2019 for corresponding International Application No. PCT/US2018/063696, filed Dec. 3, 2018.

* cited by examiner

EXTENSOMETER STRUCTURE

BACKGROUND

The discussion below is merely provided for general background information and is not intended to be used as an aid in determining the scope of the claimed subject matter.

Extensometers are commonly used for measuring strain in a test specimen. Numerous forms of extensometers have been advanced in the art. One type of extensometer utilizes two extension arms held together by a cross-flexure assembly. Flexure members of the cross-flexure assembly form a pivot axis that allows the extension arms to pivot with respect to each other to measure strain in a test specimen. Although this form of an extensometer functions quite well, improvements can be made.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

One general aspect includes an extensometer structure including: a first extension arm having a first mount configured to support a first specimen engaging member, a second extension arm having a second mount configured to support a second specimen engaging member, a connecting member extending between the first and second extension arms and pivotally connected to each of the first and second extension arms between each corresponding mount and a remote end of the extension arm, and a rear coupling assembly connecting remote ends of the extension arms together.

Implementations may include one or more of the following features. The extensometer structure where the rear coupling assembly includes at least one coupling link and a pivoting assembly connected in series to the remote ends of the first extension arm and the second extension arm. The extensometer structure where the at least one connecting link and pivoting assembly includes the connecting link connected to the remote end of the first extension arm and the pivoting assembly including a first portion connected to the remote end of the second extension arm and a second portion pivoting relative to the first portion and connected to the connecting link on an end opposite the end connected to the first extension arm. The extensometer structure where the connecting link includes a flexure. The extensometer structure where the pivoting assembly includes a cross-flexure assembly. The extensometer structure where the second pivot connection, a pivot axis of the cross-flexure, and a pivot connection between the second extension arm and the connecting member are in a common line with each other. The extensometer structure where a spacing between the first and second pivot connections is approximately equal to a spacing of pivot connections connecting the first and second extension arms to the connecting member. The extensometer structure where the connecting link includes a rigid link having a first pivot connection connected to the first extension arm and a second pivot connection connected to the second portion of the pivoting assembly.

The extensometer structure and a fixing assembly having a movable locking member configured to engage each of the extension arms and selectively hold the arms in a fixed position relative to each other. The extensometer structure where the fixing assembly is disposed between the connecting member and the coupling link. The extensometer structure where the fixing assembly includes a locking member that pivots or rotates with respect to at least one of the extension arms. The extensometer structure where the fixing assembly includes a rotatable shaft extending through the first extension arm and the second extension arm. The extensometer structure where the fixing assembly includes: a first cam secured to the shaft to rotate therewith, the first cam selectively engagable with the first extension arm; and a second cam secured to the shaft to rotate therewith, the second cam selectively engagable with the second extension arm. The extensometer structure where the first extension arm includes a first aperture and the second extension arm includes a second aperture, the rotatable shaft extending through the first aperture and the second aperture, the first cam being disposed in the first aperture and the second cam being disposed in the second aperture. The extensometer structure where the locking member moves linearly with respect to at least one of the extension arms. The extensometer structure of where the fixing assembly includes a locking plate including portions that releasably engage portions of each of the extension arms. The extensometer structure where the locking plate extends through an aperture provided in each of the extension arms. The extensometer structure and further including a force generating assembly coupled to the extensometer arms having a spring element to urge the extension arms toward a test specimen. The extensometer structure where the force generating assembly includes a control element where the control element is joined to the spring element, the control element movable relative to a stationary member. The extensometer structure where the locking plate moves with the control element. The extensometer structure where the spring element is connected to the connecting member. The extensometer structure where the connecting member includes an h shaped member with upper free ends pivotally connected to the first extension arm and lower free ends pivotally connected to the second extension arm, the h shaped member having a center portion disposed between the first and second extension arms. The extensometer structure where the spring element includes a first spring element on a first side of the extension arms and a second spring element on a second side of the extension arms. The extensometer structure where the force generating assembly further includes a movable mounting block pivotally connected to the connecting member, each of the spring elements joined to the movable mounting block. The extensometer structure where each of the spring elements include a flexure. The extensometer structure where each of the spring elements include a pair of parallel flexures. The extensometer structure where the locking plate moves relative to the control element.

The extensometer structure and further including a user adjustable driver connected to the control element to adjust a position of the control element relative to the stationary member. The extensometer structure where the user adjustable driver includes a rotatable threaded member configured to adjust the position of the control element relative to the stationary member. The extensometer structure where the user adjustable driver includes a movable block slidably engaging the control element. The extensometer structure where the movable block is slidable in the stationary member. The extensometer structure where the movable block has a variable width between sliding engagement with the control element and the stationary member. The extensometer structure where the movable block is movable relative to the stationary member to any of a plurality repeatable positions. The extensometer structure and further including a scale indicating each position of the plurality of repeatable positions. The extensometer structure and further including a fixing device to selectively fix the movable block to the stationary member.

Another general aspect includes an extensometer structure including: a first extension arm, a second extension arm movably connected to the first extension arm. The extensometer structure also includes a fixing assembly coupled to each of the first extension arm and the second extension arm configured to selectively fix the first extension arm to the second extension arm.

Implementations may include one or more of the following features. The extensometer structure where the fixing assembly includes a rotatable shaft extending through the first extension arm and the second extension arm. The extensometer structure where the fixing assembly includes: a first cam secured to the shaft to rotate therewith, the first cam selectively engagable with the first extension arm; and a second cam secured to the shaft to rotate therewith, the second cam selectively engagable with the second extension arm. The extensometer structure where the first extension arm includes a first aperture and the second extension arm includes a second aperture, the rotatable shaft extending through the first aperture and the second aperture, the first cam being disposed in the first aperture and the second cam being disposed in the second aperture. The extensometer structure where the fixing assembly includes an arm disposed between the first extension arm and the second extension arm and rotatably coupled to the rotatable shaft. The extensometer structure and a connecting member pivotally connected to each of the extension arms. The extensometer structure where the connecting member includes an h shaped member with upper free ends pivotally connected to the first extension arm and lower free ends pivotally connected to the second extension arm, the h shaped member having a center portion disposed between the first and second extension arms. The extensometer structure and a mount pivotally connected to the connecting member, the arm being connected to the mount. The extensometer structure where the fixing assembly includes a locking plate includes portions that releasably engage portions of each of the extension arms. The extensometer structure where the locking plate extends through an aperture provided in each of the extension arms. The extensometer structure and further including a force generating assembly coupled to the extensometer arms with a spring element to urge the extension arms toward a test specimen. The extensometer structure where the force generating assembly includes a control element where the spring element joins the extensometer structure to the control element, the control element movable relative to a stationary member. The extensometer structure where the locking plate moves with the control element. The extensometer structure where the locking plate moves relative to the control element.

Yet another general aspect includes an extensometer structure including: a mounting assembly having a first mounting block movable relative to a second mounting block, an extensometer structure joined to the second mounting block and including: The extensometer structure also includes a first extension arm. The extensometer structure also includes a second extension arm movably connected to the first extension arm. The extensometer structure also includes a force generating assembly coupled to the extensometer structure with a spring element to urge the extension arms toward a test specimen.

Implementations may include one or more of the following features. The extensometer structure where the force generating assembly includes a control element where the spring element joins the extensometer structure to the control element, the control element movable relative to a stationary member. The extensometer structure where the force generating assembly includes a connecting member pivotally connected to each of the extension arms, the spring element connected to the connecting member. The extensometer structure where the connecting member includes an h shaped member with upper free ends pivotally connected to the first extension arm and lower free ends pivotally connected to the second extension arm, the h-shaped member having a center portion disposed between the first and second extension arms. The extensometer structure where the spring element includes a first spring element on a first side of the extension arms and a second spring element on a second side of the extension arms. The extensometer structure where the force generating assembly further includes a movable mounting block pivotally connected to the connecting member, each of the spring elements joined to the movable mounting block. The extensometer structure where each of the spring elements include a flexure. The extensometer structure where each of the spring elements include a pair of parallel flexures. The extensometer structure and further including a user adjustable driver connected to the control element to adjust a position of the control element relative to the stationary member. The extensometer structure where the user adjustable driver includes a rotatable threaded member configured to adjust the position of the control element relative to the stationary member. The extensometer structure where the user adjustable driver includes a movable block slidably engaging the control element. The extensometer structure where the movable block is slidable in the stationary member. The extensometer structure where the movable block has a variable width between sliding engagement with the control element and the stationary member. The extensometer structure where the movable block is movable relative to the stationary member to any of a plurality repeatable positions. The extensometer structure and further including a scale indicating each position of the plurality of repeatable positions. The extensometer structure and further including a fixing device to selectively fix the movable block to the stationary member.

Another general aspect includes an extensometer structure including: a first extension arm, a second extension arm movably connected to the first extension arm. The extensometer structure also includes a first mount configured to hold a first specimen engaging device, the first mount connected to the first extension arm with a first flexure allowing movement of the first mount relative to the first extension arm. The extensometer structure also includes a second mount configured to hold a second specimen engaging device, the second mount connected to the second extension arm.

Implementations may include one or more of the following features. The extensometer structure where the first flexure is configured to allow free lateral movement of the first mount, the lateral movement being orthogonal to an axis of elongation of the first extension arm. The extensometer structure and further including a second flexure joining the second mount to the second extension arm where the second flexure is configured to allow free lateral movement of the second mount, the lateral movement being orthogonal to an axis of elongation of the second extension arm. The extensometer structure and further including a second flexure joining the second mount to the second extension arm where the second flexure is configured to allow free lateral movement of the second mount, the lateral movement being orthogonal to a plane having a first axis of elongation of the first extension arm and a second axis of elongation of the second extension arm. The extensometer structure where the first flexure is configured to allow free lateral movement of the first mount, the lateral movement being orthogonal to a plane having a first axis of elongation of the first extension arm and a second axis of elongation of the second extension arm. The extensometer structure where the first flexure is configured to allow selected, fixed positioning of the first mount relative to the first extension arm. The extensometer structure where the first flexure includes a first end fixedly secured to the first extension arm and a second end secured to the first mount, where the second end includes an adjustable member to adjust a spacing between the second end and the first extension arm. The extensometer structure where the first flexure is configured to allow selected, fixed positioning of the first mount relative to the first extension arm. The extensometer structure where the first flexure is configured to allow selected, fixed positioning of the first mount relative to the first extension arm so as to adjust a spacing between the first mount and the second mount.

Yet another general aspect includes an extensometer structure including: a first extension arm having a first mount configured to support a first specimen engaging member, a second extension arm having a second mount configured to support a second specimen engaging member. The extensometer structure also includes a connecting member pivotally connected to each of the extension arms; a first counter weight mounted to the first extension arm on a first side of the connecting member, the first counter weight of mass to offset at least some of the mass present on the first extension arm on a second side of the connecting member opposite the first counter weight; and a second counter weight mounted to the second extension arm on the first side of the connecting member, the second counter weight of mass to offset at least some of the mass present on the second extension arm on the second side of the connecting member opposite the second counter weight.

Implementations may include one or more of the following features. The extensometer structure and further including a mount connected to each end of arm, each mount configured to hold a test specimen engaging member, each of the counter weights being secured to each corresponding mount. The extensometer structure where each counter weight includes an aperture through which a test specimen engaging member mounted to each associated mount can extend therethrough. The extensometer structure where each counter weight includes an extending flange, where the extending flanges overlap each other in a spaced apart relationship. The extensometer structure where each counter weight includes a reflective outer surface to reflect heat energy.

Another general aspect includes an extensometer structure including: a first extension arm, a second extension arm movably connected to the first extension arm. The extensometer structure also includes a first mount connected to an end of the first extension arm and configured to hold a first specimen engaging device. The extensometer structure also includes a second mount to an end of the second extension arm configured to hold a second specimen engaging device, the second mount connected to the second extension arm. The extensometer structure also includes where each mount and associated end of each extension arm includes a coolant passageway.

Implementations may include one or more of the following features. The extensometer structure where each passageway includes a coolant tube. The extensometer structure and a plurality of coolant lines fluidly connecting each of the passageways to an inlet port and outlet port. The extensometer structure where the passageways are connected in series with each other and the inlet and outlet ports.

BRIEF DESCRIPTION OF THE DRAWING

Further details and advantages follow from the below description of embodiments of the invention with reference to the drawings in which.

DETAILED DESCRIPTION OF ILLUSTRATIVE EMBODIMENTS

Figure 1:
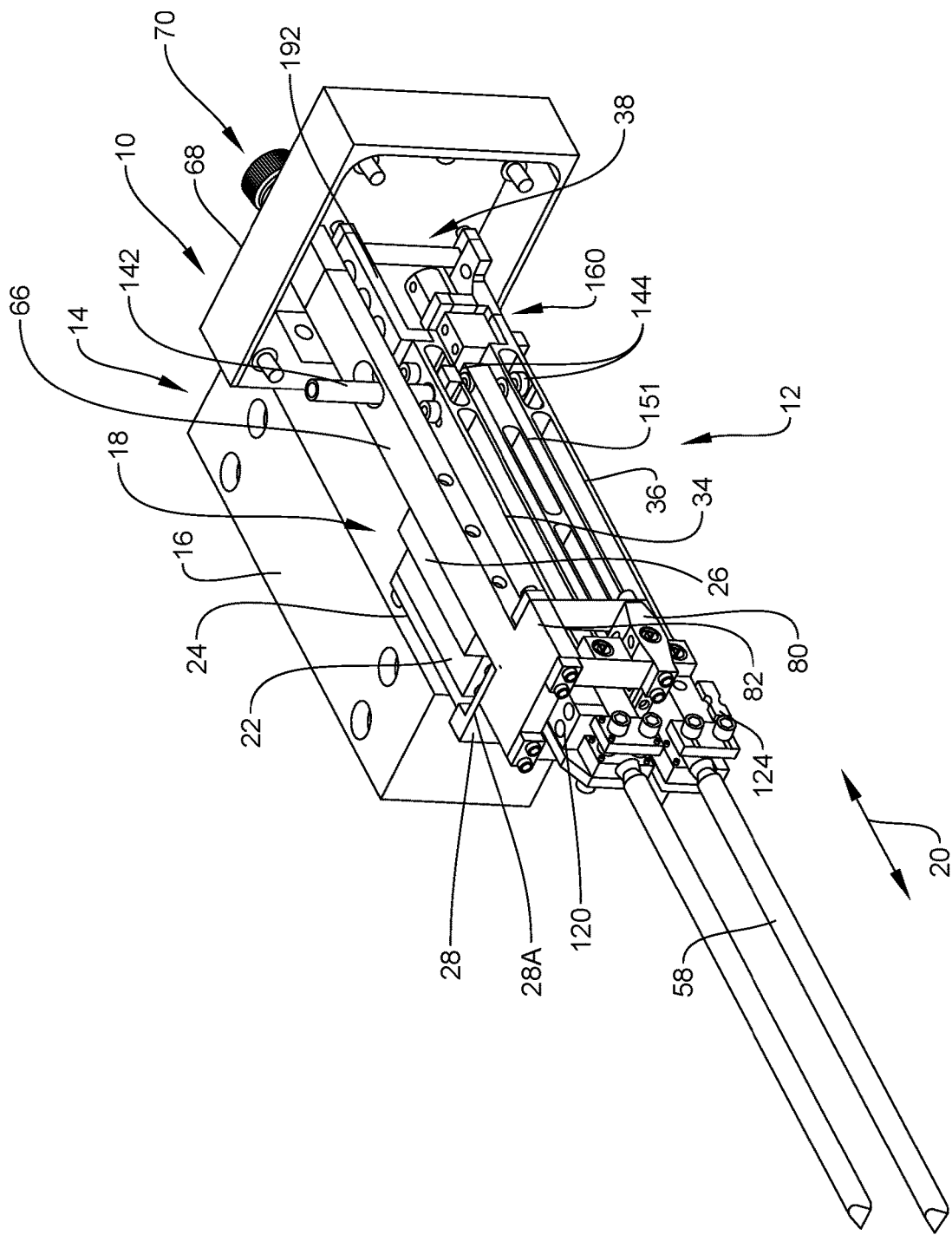
FIG. 1 is a perspective view of an extensometer.

An embodiment of an extensometer having aspects of the present invention is illustrated in FIG. 1 at 10. The extensometer 10 includes an extensometer structure 12 mounted to a mounting assembly 14. As used herein the "extensometer structure" means at least some of the interconnected mechanical components and does not include any sensing device for measuring movement of components of the extensometer structure. Rather, various types of sensing devices can be used with the extensometer structure disclosed herein to form an operable extensometer that provides an output signal indicative of displacement such as elongation of a test specimen.

The mounting assembly 14 allows the extensometer 10 to be secured to a suitable stationary support, not shown. In the embodiment illustrated, the mounting assembly 14 includes a mounting block 16 secured to the stationary support. A slide assembly 18 includes a slide plate 22 mounted to the extensometer structure 12 herein with a plate adapter 26. The slide plate 22 mates with and slides relative to a slide plate 24 that is secured to the mounting block 16. An overtravel stop comprising, for example, a block 28 secured to one of the sliding plates 22 and 24, herein slide plate 22 limits movement of the extensometer structure 12 relative to the mounting assembly 14 due to contact of the slide plate 24 with an overlapping flange 28A.

Figure 2:
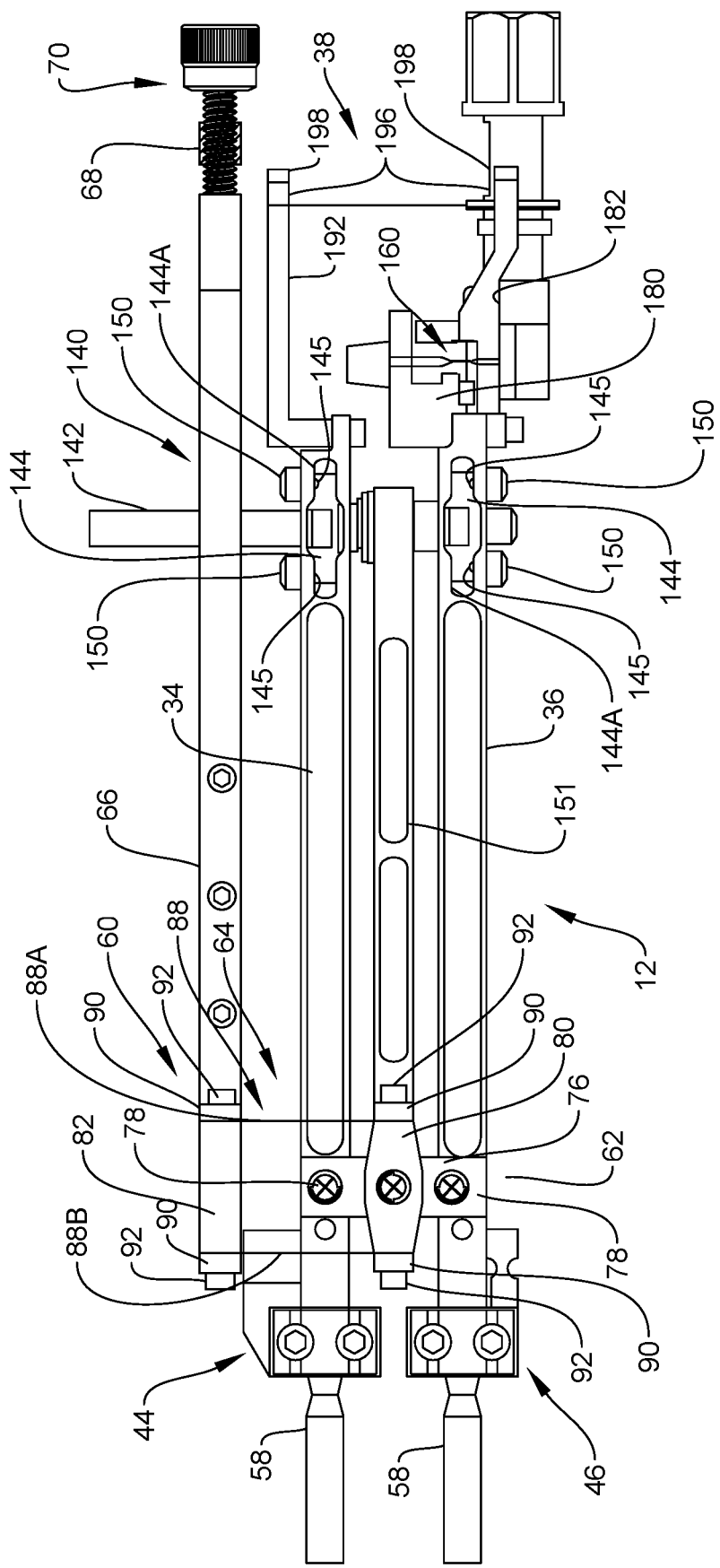
FIG. 2 is a side elevation view of the extensometer of FIG. 1 with portions removed.

Referring to FIG. 2, the extensometer structure 12 includes a first extension arm 34 and a second extension arm 36 connected together at remote ends by a rear coupling assembly preferably including in part a coupling link 38. The first extension arm 34 includes a mount 44 on an end of the extension arm 34 remote from the coupling link 38. Similarly, the second extension arm 36 includes a mount 46 on an end remote from the coupling link 38. The mounts 44, 46 are configured to hold specimen engaging devices, herein illustrated as elongated rods 58; however, this should not be considered limiting in that the mounts 44, 46 can be configured to hold other end devices such as, but not limited to, knife edges or other forms of specimen engaging devices.

A first aspect disclosed is a force generating assembly 60 that allows the user to adjust the amount of force exerted upon the test specimen by the test specimen engaging devices mounted to the ends of the first and second extension arms 34 and 36, herein exemplified by elongated rods 58. The force generating assembly 60 is particularly advantageous because it is configured to apply substantially equal forces through each of the extension arms 34 and 36. Generally, the force generating assembly 60 includes a coupling assembly 62 that couples the extension arms 34, 36 so as to split or balance the force applied through the extension arms 34, 36 equally. The force generating assembly 60 also includes a flexure assembly 64 that in turn is connected to a control arm 66. The control arm 66 is movably or adjustably connected to the mounting assembly 14 allowing the control arm 66 to move portions of the extensometer structure 12 relative to the mounting assembly 14. Referring to FIG. 1, the mounting assembly 14 includes a portion herein comprising a reaction block 68. An actuation device 70 herein comprising a rotatable screw allows the control arm 66 to be selectively displaced away from the reaction block 68 when movement of the extensometer structure 12 toward the test specimen is desired.

The flexure assembly 64 couples the control arm 66 to the coupling assembly 62 and functions as a compliant spring. The coupling assembly 62 couples portions of the extension arms 34 and 36 together with a connecting member 76 with pivot connections 78 thus allowing the connecting member 76 to pivot relative to each of the extension arms 34 and 36. The pivot connections 78 can be any form of pivot connection, preferably of low pivotal resistance. In one advantageous embodiment, the pivot connections have non-mating components so as to avoid friction between mating parts. A particularly advantageous embodiment is to form the pivot connections using orthogonal cross-flexures.

The flexure assembly 64 further includes a flexure mounting block 80 and a fixed, relative to the control arm 66, flexure mount 82 secured to the control arm 66. The flexure mounting block 80 is pivotally connected to the connecting member 76 also with a pivot connection 78. At least one flexure member 88 joins the flexure mounting block 80 to the fixed flexure mount 82 and functions as a spring element. Actuation of the actuation device 70 to move the control arm 66 relative to the reaction block 68 of the mounting assembly 14 in turn causes movement of the extension arms 34 and 36 toward the test specimen until contact is made with the specimen engaging devices upon which further movement of the control arm 66 with respect to the reaction block 68 will cause the deflection of the flexure member 88 generating a spring force therein, which is applied through the extension arms 34, 36 and the test specimen engaging devices herein elongated rods 58 upon the test specimen, not shown. Moreover, due to the pivotal connection of the flexure mounting block 80 to the connecting member 76 and the pivotal connections of the connecting member 76 to each of the extension arms 34 and 36 a substantially equal force is provided through each of the extension arms 34, 36 and the test specimen engaging devices. The user can adjust the amount of force that is applied through forced displacement of the control arm 66 relative to the reaction block 68 of the mounting assembly 14. The coupling assembly 62 ensures that the forces applied through the extension arms 34, 36 are substantially equal.

Figure 3:
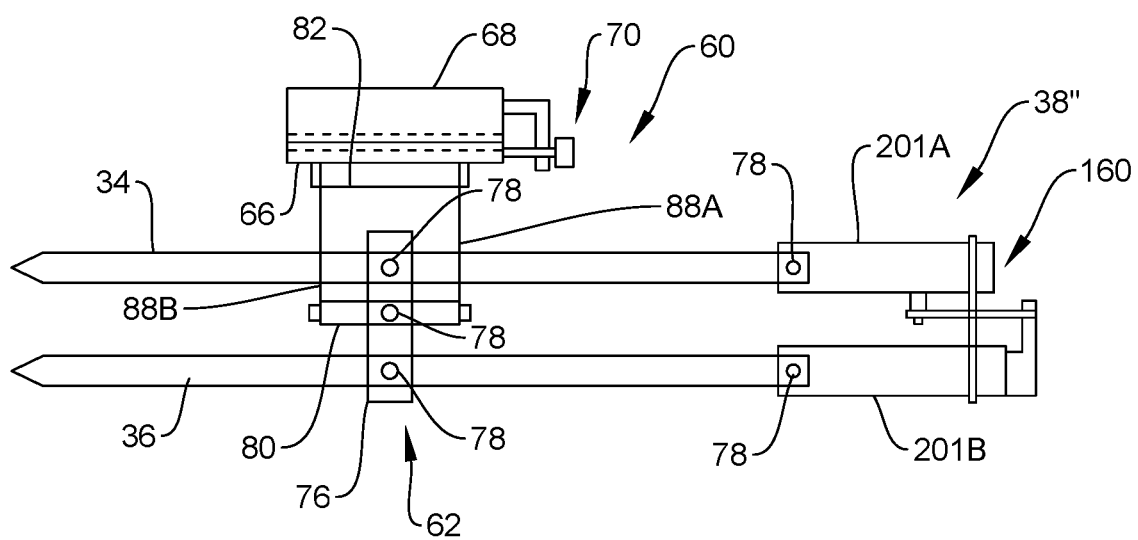
FIG. 3 is a schematic side elevational view of a second embodiment of an extensometer.

The side elevational view of FIG. 3 schematically shows elements comprising the force generating assembly 60 that being the coupling assembly 62, control arm 66, connecting member 76, reaction block 68, actuating device 70, pivot connections 78, flexure mounting block 80, fixed flexure mount 82 and at least one spring element herein comprising one or more flexure members 88. In FIG. 3, the force generating assembly 60 includes two flexure members 88A, 88B that are provided on opposite sides of the axis of rotation of the pivot connection 78 connecting the flexure mounting block 80 to the connecting member 76. It should be noted that the flexure members 88A, 88B can be secured to the flexure mounting block 80 and the fixed flexure mount 82 with suitable fastening devices herein comprising by example mounting blocks 90 and suitable fasteners such as threaded screws 92 (FIG. 2).

Figure 4:
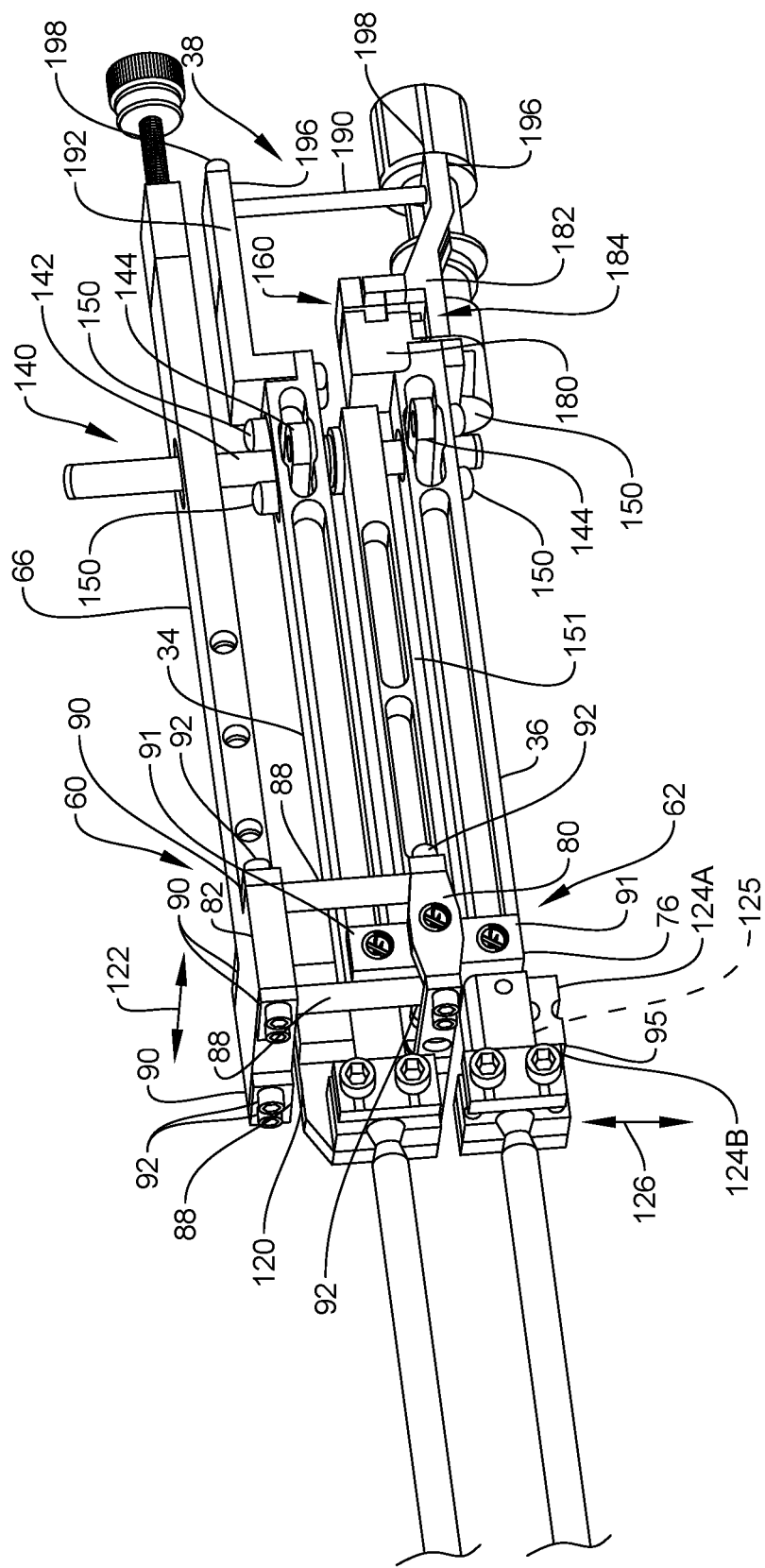
FIG. 4 is a perspective view of the extensometer with portions removed.
Figure 5:
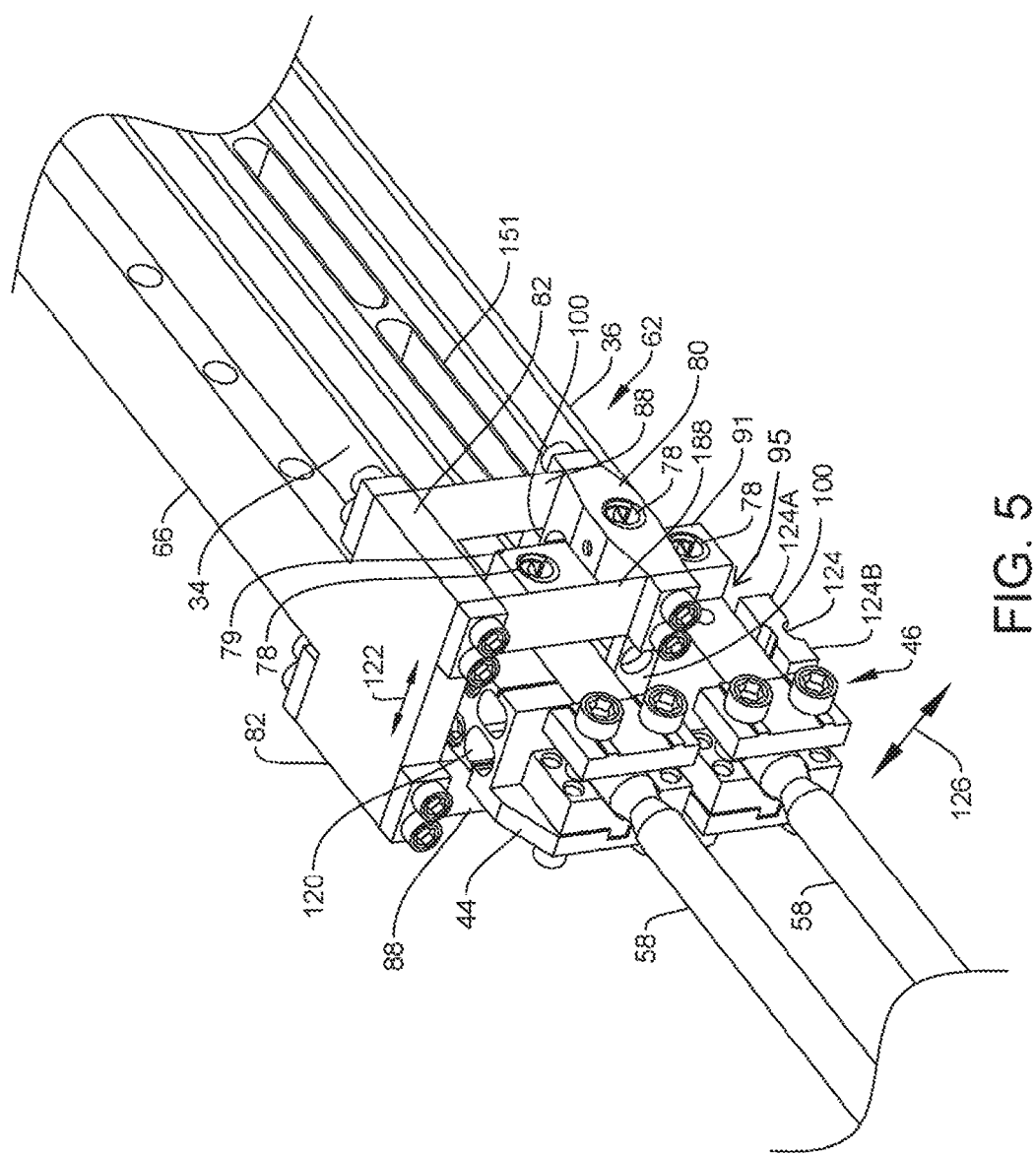
FIGS. 5 and 6 are enlarged views of the extensometer of FIG. 1 with portions removed.
Figure 6:
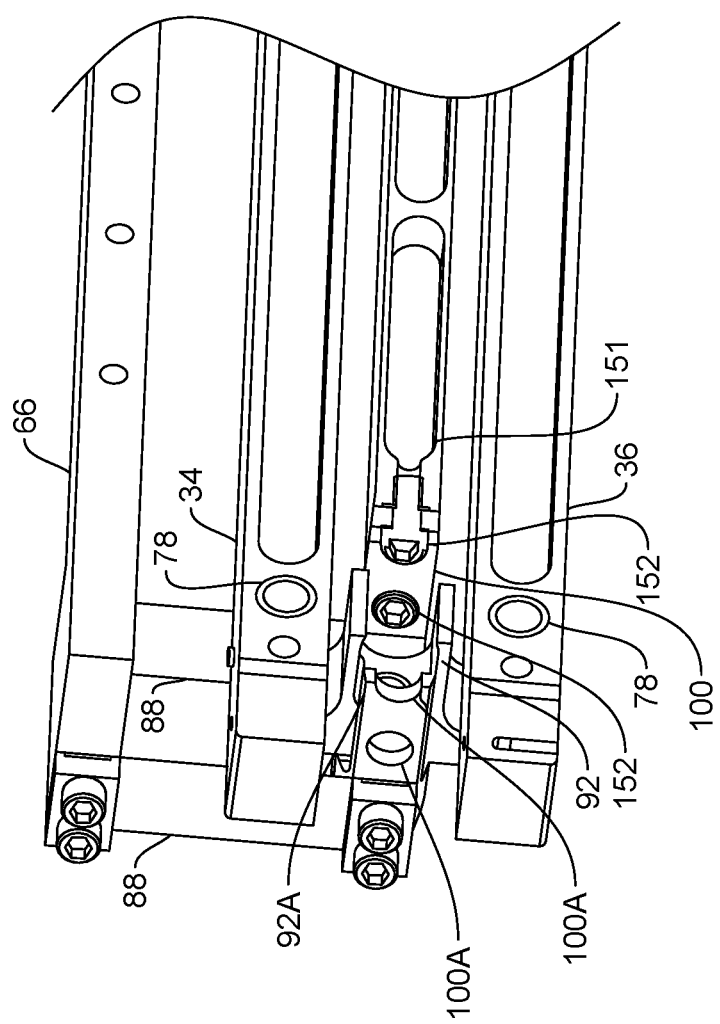

FIGS. 1 and 4-6 illustrate a preferred embodiment of the force generating assembly 60. In this embodiment, the force generating 60 assembly includes at least one flexure member 88 on each side of the extension arms 34 and 36. Preferably, two flexure members 88 are provided on each side so as to form two parallel spring structures connecting the flexure mounting block 80 to the fixed flexure mount 82. As may be best illustrated in FIG. 4, the connecting member 76 has an "H" configuration wherein extending free arm portions 91 are pivotally connected to each of the extension arms 34, 36 with pivot connections 78 (FIGS. 4 and 5) while a center interconnecting portion 95 connects the end portions 91 together (FIG. 6). When a spring element is provided on each side of the extension arms 34, 36 the flexure mounting blocks 80 on each side of the extension arms 36 are connected together with at least one link, although in a preferred embodiment a link 100 on each side of the connecting member 76 is provided. Preferably, the flexure mounting blocks 80 and the link(s) 100 are integral being formed from a single unitary body. In the embodiment illustrated in FIG. 1, the slide assembly 18 acts as a linear guide to constrain the bending of the flexure members 88 in the directions shown by the double arrow 20.

At this point, it should be noted that additional flexure members can be provided on ends of the extension arms 34 and 36 so as to provide horizontal and vertical compliance and/or adjustability if desired. Referring to FIG. 5, the mount 44 for extension arm 34 includes a flexure member 120 formed integrally in the mount as a single unitary body or as separately attached thereto. The flexure member 120 allows horizontal compliance as indicated by double arrow 122. Double arrow 122 comprises lateral movement of the mount 44 relative to the axis of elongation of the extension arm 34, preferably lateral movement of the mount 44 to the plane defined by the axis of elongation of the extension arm 34 and the axis of elongation of the extension arm 36.

In this embodiment, mount 46 for the lower extension arm 36 includes flexure 124 that is connected to the end of the extension arm 36. The flexure 124 can be a separate block forming part of the mount 46 or be integrally formed therewith as a single unitary body. The flexure 124 has a first end 124A fixably secured to the extension arm 36 while a moveable end 124B is connected to or formed integrally with the mount 44. The flexure 124 thus allows the mount 46 to move relative to the end of the extension arm 36 indicated by double arrow 126. In a preferred embodiment, the end 124B is adjustable toward or away from the end of the extension arm 36 so as to adjust the mount 46 connected thereto in the direction indicated by double arrow 126 so as to adjust a gauge length or spacing between the mounts 44, 46 or the specimen engaging devices connected thereto. Referring to FIG. 4, one or more adjustable members, e.g. screws 125, are used to adjust the gap between end 124B and the end of extension arm 36.

Figure 7:
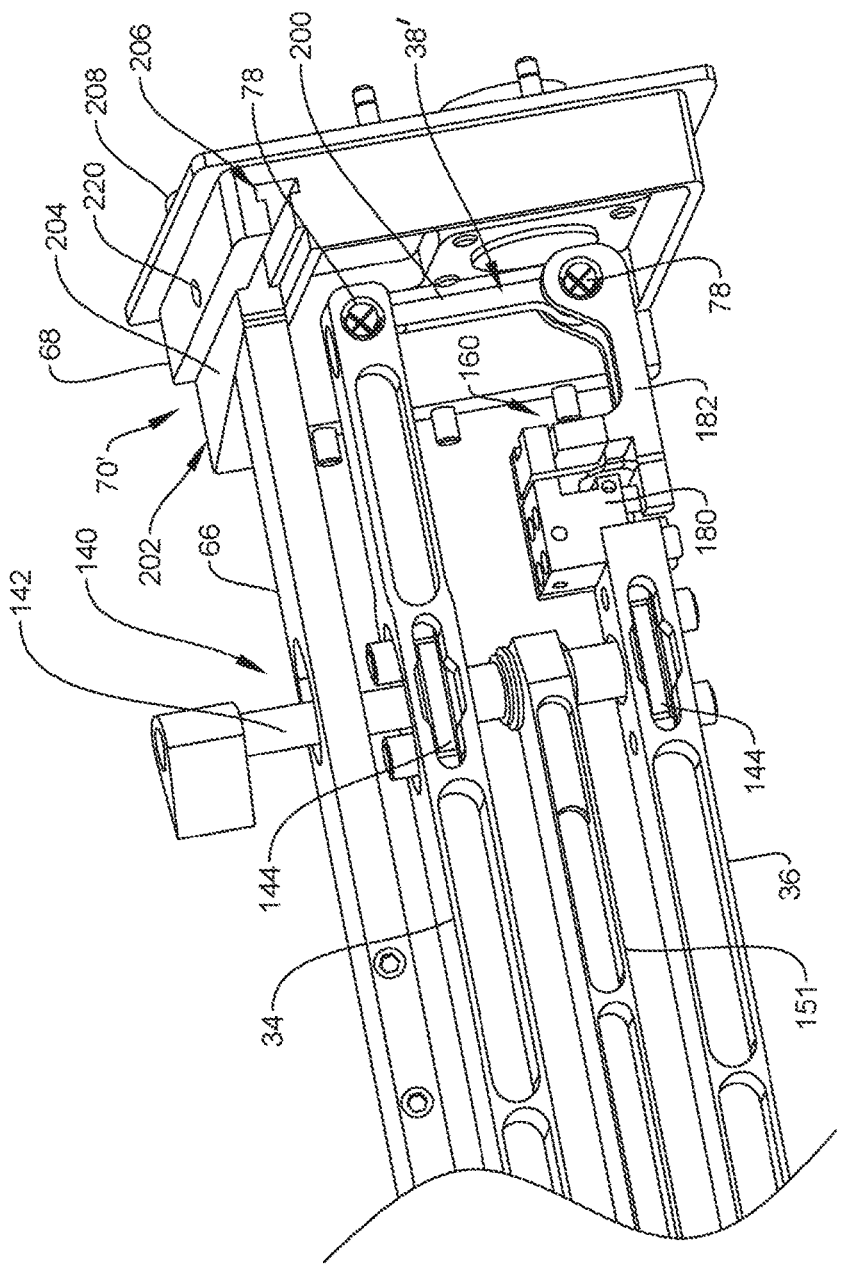
FIGS. 7-9 are enlarged views of the extensometer of FIG. 1 with a different coupling link.
Figure 8:
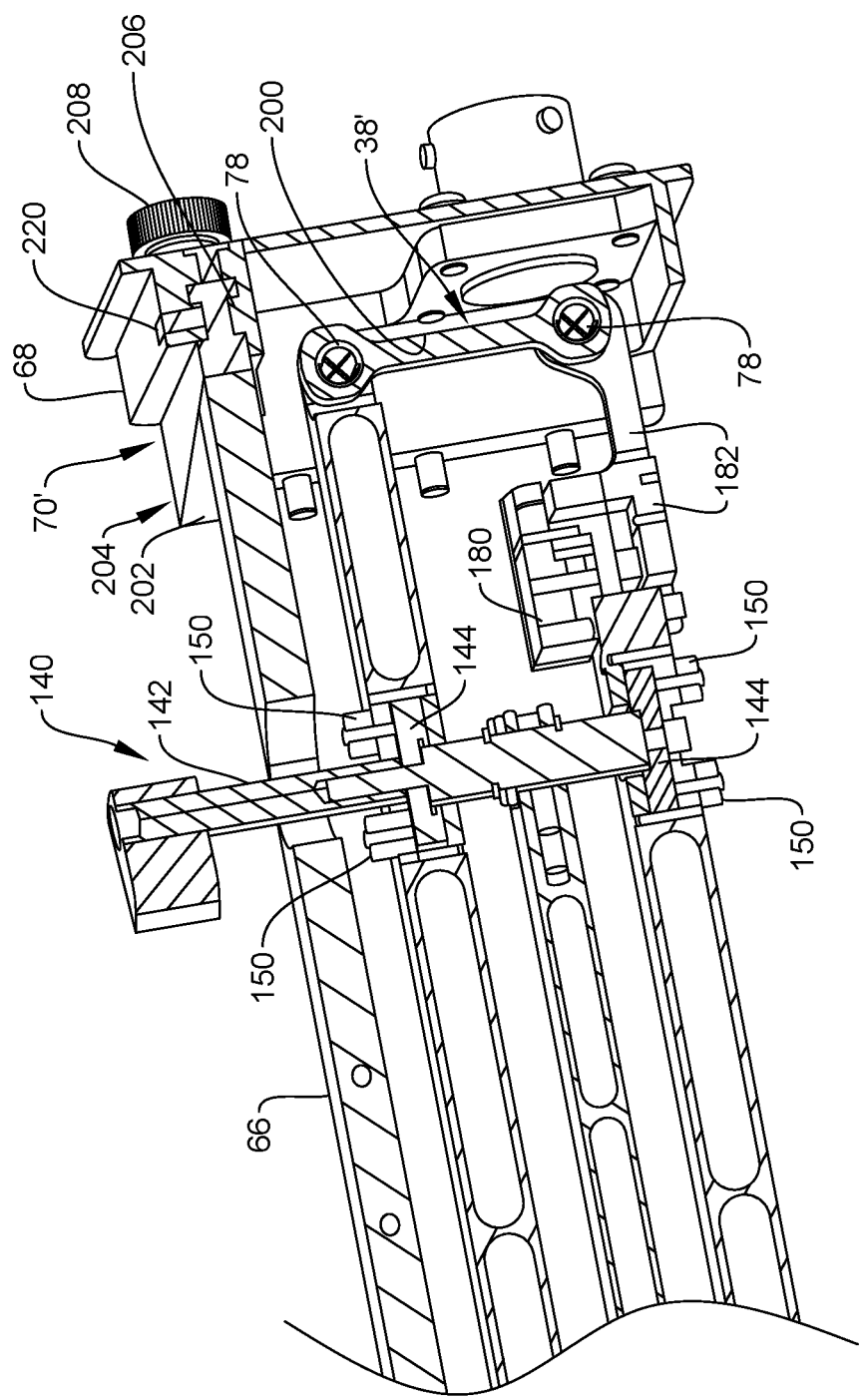

Another aspect of the disclosure includes an arm fixing assembly 140 that selectively secures the extension arms 34 and 36 together when desired. Securing the extension arms 34, 36 together is particularly advantageous so as to not damage the extensometer 10 during handling, shipment or the like. The fixing assembly 140 can be considered a locking device. Referring for example to FIGS. 2, 7 and 8, in one embodiment, the fixing assembly 140 includes an elongated shaft 142 extending through aligned apertures provided in each of the extension arms 34 and 36. A movable locking member here illustrated as a locking cam 144 for each extension arm 34, 36 selectively, releasably engages the corresponding extension arm 34, 36 and holds them together in a fixed position. Since the locking cams 144 are coupled together via coupling member here comprising the elongated shaft 142, simultaneous locking of the extension arms 34, 36 is provided. A tactile indication is preferably provided when locking occurs. In the embodiment illustrated, at least one plunger 150 is provided for the fixing assembly 140 and preferably includes at least one plunger for each locking cam 144. Each plunger 150 includes a moveable ball or projecting element that engages an opposing surface of each cam 144. Concave surface portions 145 (FIG. 2) can be provided on each of the cams 144 to be engaged by the projecting element(s) and provide a tactile indication that the elongated shaft 142 and cams 144 have been sufficiently positioned. In a particularly convenient form, each of the locking cams 144 is located within an aperture 144, formed in each of the extension arms 34 and 36. This configuration shields the contact surfaces of the locking cams 144 from at least some environmental dust or contamination as well as provides a convenient manner in which to mount the plungers 150 so that the projecting elements thereof project into the apertures 144A.

The fixing assembly 140 can further include an arm 151 located between the extension arms 34, 36 having a first end rotatably coupled to the elongated shaft 142 and a second end fixedly connected to the flexure mounting blocks 80, in particular, link 100 joined between them as illustrated in FIG. 6. The center interconnecting portion 95 can include an aperture 92A so as to allow access to mounting screws 152 to connect link 100 to the end of arm 151. Apertures 100A in the other link 100 are also provided to allow access to screws 152. In the embodiment illustrated, the elongated shaft 142 of the fixing assembly 140 is supported by the arm 151, where the arm 151 in turn is connected to the force generating assembly 60. It should be noted that in another embodiment the elongated shaft 142 can be supported by a stationary element such as found on the mounting assembly 14, for example the reaction block 68. When the cams 144 engage the plungers 150 the arms 34, 36 are fixed, whereas when the cams 144 are rotated so as to disengage from the plungers 150 the arms 34, 36 are free to move.

It should be noted the connecting member 76 with the pivot connections 78 to the extension arms 34, 36 help set or define the gauge length of the extensometer so as to be repeatable with high accuracy, avoiding the need to use gauge blocks or other techniques to ensure the specimen engaging devices 58 engage the test specimen at a spacing as needed. In addition, the fixing assembly 140 holds the extension arms 34, 36 rigidly with the desired spacing until the specimen engaging devices 58 can engage the test specimen. After engagement has occurred, the fixing assembly 140 can be operated to release the arms 34, 36. The arm 151 helps to support components of the fixing assembly 140 and serves as a reference device so that the arms 34, 36 are oriented the same relative to the connecting member 76, in one preferable embodiment, where the arms 34 and 36 are parallel to each other.

The coupling link 38 comprises another aspect of the present disclosure. In a conventional connection of a cross-flexure assembly, the cross-flexure assembly is arranged so as to be connected directly to ends of the extension arms in a symmetrical manner to allow the extension arms to pivot relative to each other. However, with the coupling link 38 present, the sensor assembly herein comprising a cross-flexure assembly 160 of conventional design is connected to one of the extension arms 34, 36 herein by example extension arm 36.

Generally, the coupling link 38 is provided to ensure equal displacement of the extension arms 34, 36 as the ends of the specimen engagement devices connected to the test specimen move toward and away from each other. In the embodiment illustrated in FIGS. 1, 2 and 4 the coupling link 38 comprises a flexure which with movement of the extension arms 34, 36 having two generally spaced apart pivots. The length of the flexure of the coupling link 38 is selected such that the pivots approximately equal the desired spacing of the extension arms, in particular, the ends engaging the test specimen. This construction helps minimize common mode error where the extension arms 34, 36 move together in the same direction. It should be noted in a particularly advantageous embodiment, the spacing between the pivots 78 formed between the connecting member 76 and the extension arms 34, 36 is helpful in setting a repeatable the gauge length for the extensometer upon the test specimen. Preferably, the spacing between the pivots 78 formed between the connecting member 76 and the extension arms 34, 36 is approximately equal to the spaced apart pivots formed in the flexure 190.

In the embodiment illustrated in the figures such as FIG. 4, a first portion 180 of the cross-flexure 160 is connected to the lower extension arm 36 while a second portion 182 moves relative to the portion 180 with orthogonally oriented flexure elements indicated at 184. Although the first portion 180 is directly connected to one of the extension arms, the second portion 182 is not connected directly to the other extension arm, but rather through the coupling link 38 that extends preferably orthogonal to the elongated axes of the extension arms 34 and 36. In the embodiment illustrated, the coupling link 38 comprises a flexure 190 connected to the extension arm 34 using connecting member 192, which if desired, can be formed integrally as a single unitary body with the extension arm 34. The other end of the coupling link 38/flexure member 190 is secured to the second portion 182 of the cross-flexure 160. It should be noted preferably, one of the pivots (closest to the arm having the cross-flexure 160 attached) formed in the flexure member 190 is in line with the pivot axis of the cross-flexure 160 and the end of the specimen engaging device 58 to which the extension arm 36 is attached. The flexure member 190 can be mounted in any suitable manner herein by example using hold down blocks 196 and screws 198 to secure each of the ends of the flexure 190 to portion 182 and connecting member 192.

As is conventionally known, a cross-flexure assembly includes a first portion that pivots relative to a second portion using two flexure elements oriented orthogonal to each other in a non-contacting manner. In some embodiments, strain sensor gauges, not shown, are provided on the flexures forming the cross-flexure assembly 160 to sense movement of the portions 180, 182 relative to each other and thus movement of the extension arms 34, 36. In other embodiments, other forms of sensors sense movement of the extension arms 34, 36. For instance, sensors based on changes in capacitive, inductance or resistance can be used. Likewise, optical based sensors can be used if desired. Such sensing devices are well known. The aspects herein disclosed are not dependent on the type of sensors or sensing devices used and as such are not further discussed.

Figure 9:
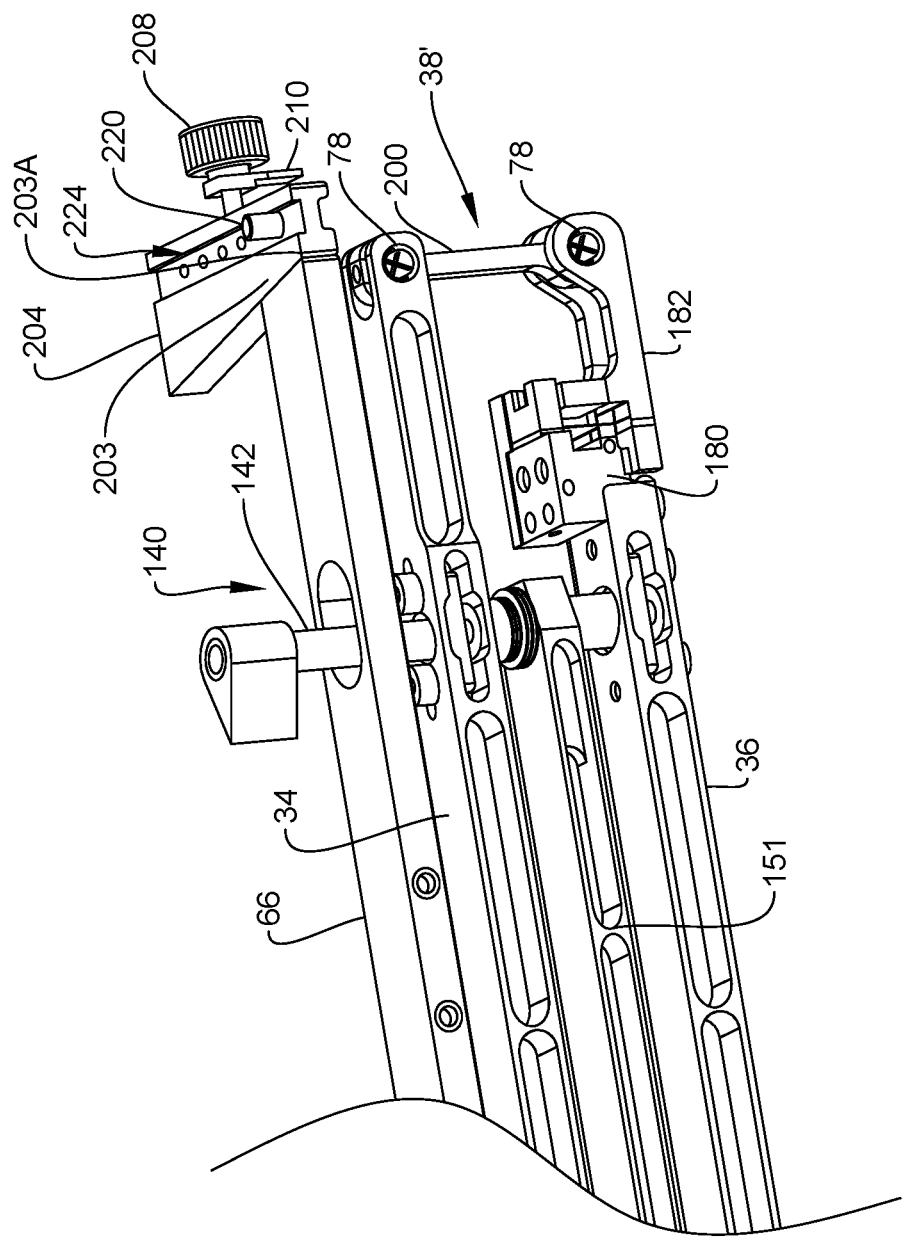

FIGS. 7-9 illustrate other embodiments or features of the above-described aspects, where the same reference numbers are used for the same or similar components. First, a coupling link 38' illustrated in FIGS. 7-9 includes a rigid link 200 rather than a flexure 190 as described above. To provide compliance the link 200 is connected with pivot connections such as pivot connections 78 preferably comprising cross flexures as described above. In this embodiment, the extension arm 34 is directly connected to link 200; however connecting member 192 in the previous embodiment is essentially part of the extension arm 34, being connected rigidly thereto.

Generally, the coupling link 38' is provided to ensure equal displacement of the extension arms 34, 36 as the ends of the specimen engagement devices connected to the test specimen move toward and away from each other. In the embodiment illustrated in FIGS. 7 and 8 the coupling link 38' comprises the rigid link 200 which with movement of the extension arms 34, 36 having two generally spaced apart pivots 78 that approximately equals the desired spacing of the extension arms 34, 36, in particular, the ends engaging the test specimen. This construction helps minimize common mode error where the extension arms 34, 36 move together in the same direction. It should be noted preferably, one of the pivots 78 (closest to the arm having the cross-flexure 160 attached) is in line with the pivot axis of the cross-flexure 160 and the end of the specimen engaging device 58 to which the extension arm 36 is attached. Preferably, the spacing between the pivots 78 formed between the connecting member 76 and the extension arms 34, 36 is approximately equal to the spaced apart pivots 78 formed in the link 78.

FIG. 3 illustrates yet another embodiment of a coupling link 38". In this embodiment, two connecting links 201A and 201B are pivotally connected to ends of extension arms 34 and 36, respectively, herein with pivots 78. A cross-flexure assembly 160 is connected in series to ends of the connecting links 201A, 201B remote from the connections to the extension arms 34, 36. The spacing of the pivots 78 is approximately equal to the spacing of the specimen engaging devices mounted to the extension arms 34,36.

As explained above, through the actuation device 70 a user can vary the amount of contact force upon the test specimen through the force generating assembly 60. However, if the user would like to repeatedly apply the same force, for example, to multiple test specimens tested at separate times, it may be difficult through rotation of the actuation device 70 since the force is dependent upon the total amount of rotation. In FIGS. 7-10, the force generating assembly 60 includes an actuation device 70' having a driver 202 to control displacement of the control arm 66 relative to the reaction block 68 in a repeatable manner. Generally, the driver 202 includes a movable member 204 that contacts an end of the control arm 66. In one embodiment, the movable member 204 is a plate that slides in a guide 206, herein formed in the reaction block 68. The movable member 204 has a width that varies along it length where the movable member 204 and guide 206 are configured such that contact of the movable member 204 with the end of the control arm 66 displaces the control arm 66 as a function of the width of the portion of the movable member 204 in contact with the end of the control arm 66. Although not required in one embodiment the guide 206 is configured to provide a guide path for the movable member 204 that is orthogonal to an axis of elongation of the control arm 66 so that displacement of the control arm 66 is only dependent upon the width of the portion of the movable member 204 in contact with the movable member 204.

Figure 10:
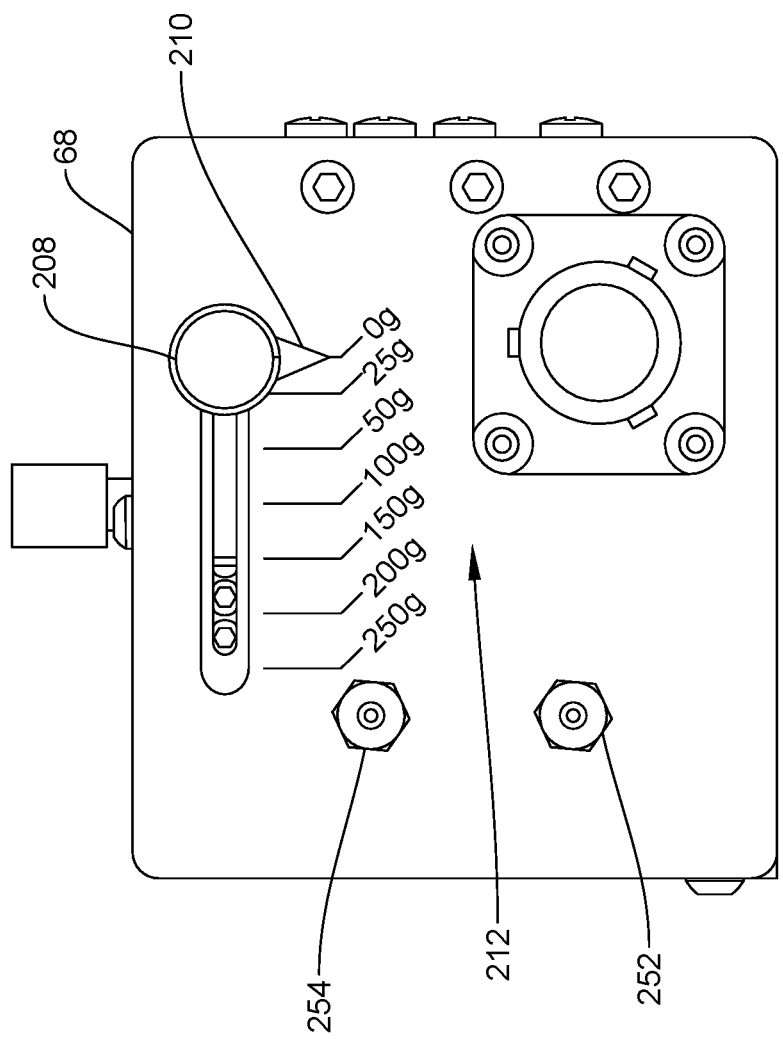
FIG. 10 is a rear elevational view of the extensometer of FIG. 1.

Referring also to FIG. 10, the driver 202 includes a user graspable member such as knob 208 with an indicator 210 attached thereto. The indicator 210 moves with the movable member 204 and relative to scale 212 provided on the reaction block 68. Using the knob 208 the user can slide the movable member 204 and the indicator 210 to a selected position on the scale 212. If desired, the knob 208 can be rotated such that the knob 208 frictionally engages and is secured to the reaction block 68 at the selected position.

At this point it should be noted that an angle of inclination of contact 203 (see for example FIG. 9) between the end of the control arm 66 and the movable member 204 can be adjusted so as to provide the desired range of forces to be generated by the force generating assembly 60. The angle of inclination 203 can be referenced from a reference axis 203A that is parallel to the path of guided movement of the movable member 204. Generally, a greater angle of inclination 203 provides a larger range of forces that can be generated. A lesser angle of inclination 203 may have a smaller range of forces that can be generated, but with higher resolution. It should be noted the although the angle of inclination 203 is constant in the illustrate embodiment, this should not be considered limiting in that the shape of the surface of the movable member 204 contacting the control arm 66 need not be planer as shown but can also vary, thus providing a varying angle of inclination 203 depending on where the end of the control arm 66 contacts the movable member 204.

If desired, a tactile indication can be provided to the user as a function of the movable member 204 being located in preselected positions corresponding to at least some of the positions indicated by the scale 212. Referring to FIGS. 8 and 9 a detent mechanism selectively comes in engagement with areas to provide a tactile indication. In the embodiment illustrated, the detent mechanism comprises a plunger 220 that selectively comes into engagement with apertures or recesses 224. In the exemplary embodiment, the plunger 220 is secured to the reaction block 68 in a fixed position, while the movable member 204 includes the apertures or recesses 224; however in another embodiment the plunger 220 can move with the movable member 204 with the apertures or recesses provided in the reaction block 68.

Figure 11:
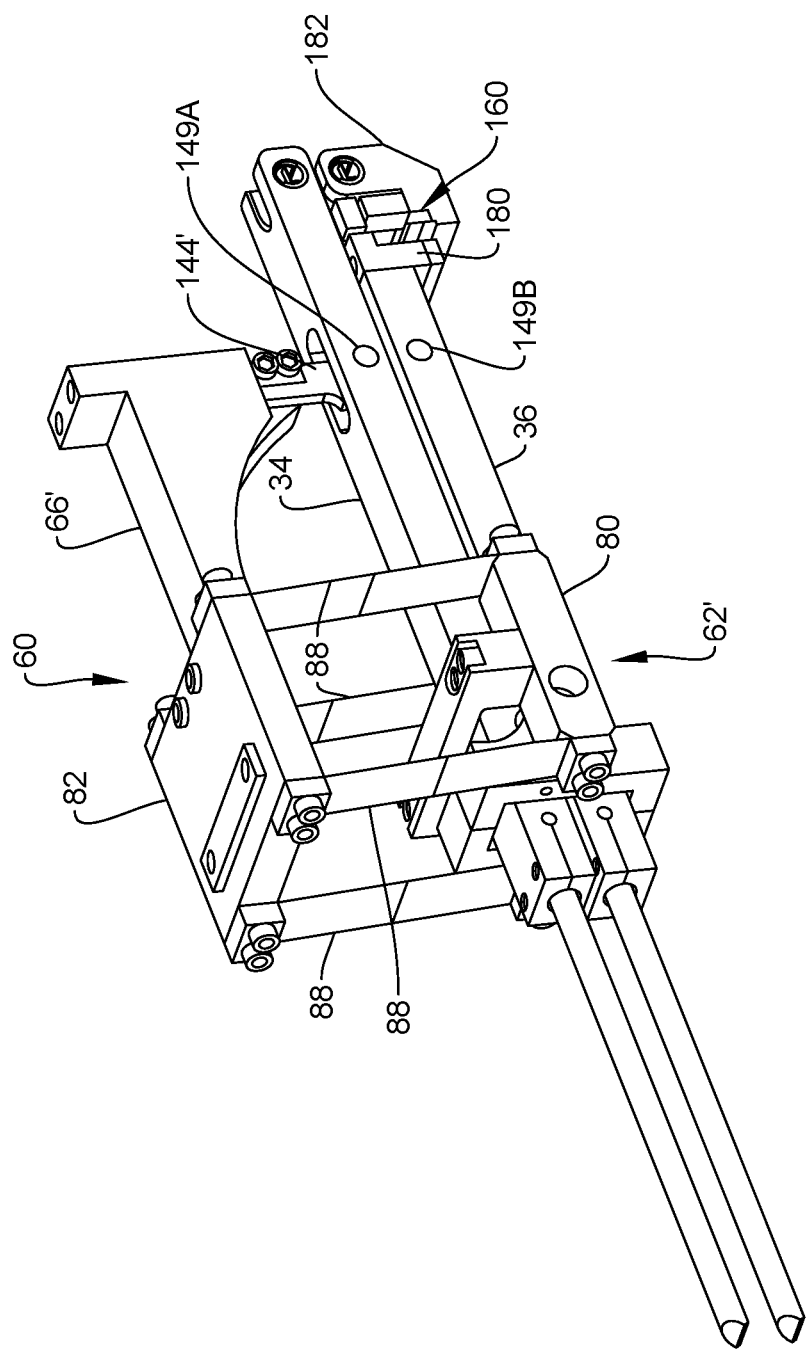
FIG. 11 is a perspective view of a second embodiment of an extensometer.
Figure 12:
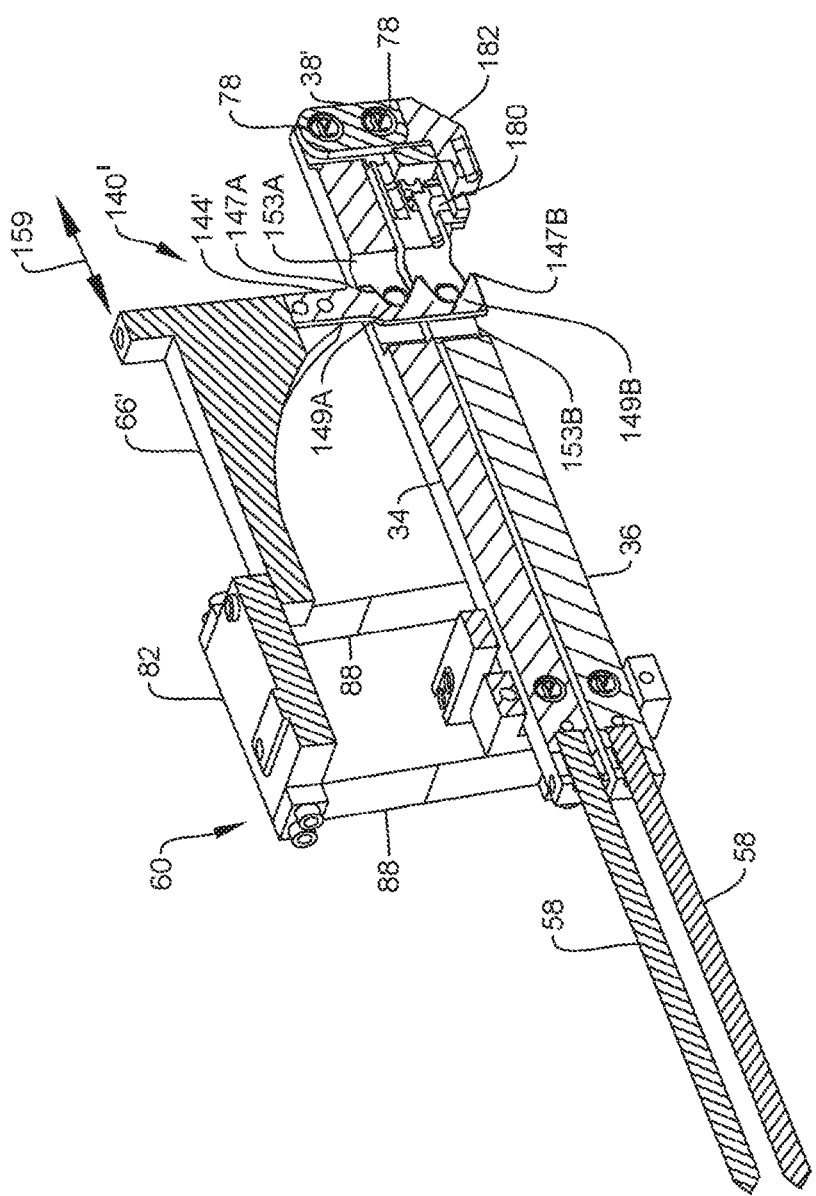
FIGS. 12 and 13 are perspective views of the extensometer of FIG. 11 with portions removed.
Figure 13:
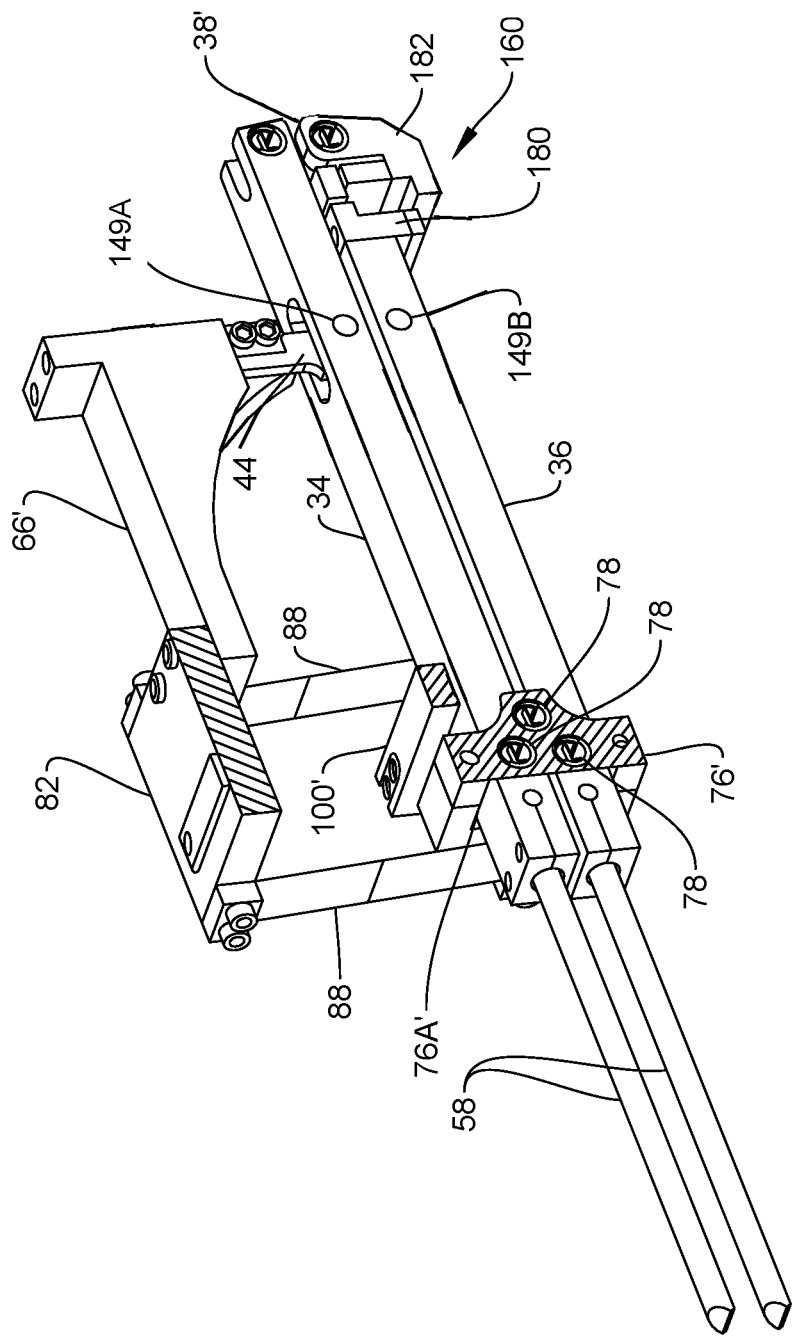

FIGS. 11-13 illustrate another embodiment of an extensometer with variations of some of the features of described aspects, where the same reference numbers are used for the same or similar components. In particular, FIGS. 11-13 illustrate an arm fixing assembly 140' that selectively secures the extension arms 34 and 36 together when desired. As indicated above, securing the extension arms 34, 36 together is particular advantageous so as to not damage the extensometer during handling, shipment or the like. Like the fixing assembly 140, the fixing assembly 140' can be considered a locking device having a movable locking member, which in this embodiment is a locking plate 144' that selectively releasably engages portions of each of the extensions arms 34 and 36. As illustrated, the locking plate 144' includes notches or recesses 147A and 147B that receive portions of arms 34, 36 herein comprising pins 149A and 149B, respectively. In this embodiment, each arm 34, 36 includes an aperture 153A, 153B, respectively, in which pins 149A, 149B are disposed, respectively. The apertures 153A and 153B also are of size so as to receive the locking plate 144' and allow relative movement therein. The locking plate 144' is supported by control arm 66'. Like the control arm 66 described above, the control arm 66' is coupled to the force generating assembly 60 and is movable through an actuation device, represented in FIG. 11 as double arrow 159 but can comprise elements similar or functionally equivalent to that actuation device 70, 70'. Like control arm 66, control arm 66' when displaced toward the test specimen (not shown) will move the specimen engaging devices 58 so as to contact the test specimen. Continued displacement of the control arm 66' after contact of the specimen engaging devices 58 with the test specimen will then store spring energy in the force generating assembly 60. However, in this embodiment, since the locking plate 144' is coupled to the control arm 66', movement of the control arm 66' also moves the locking plate 144' relative to the extensions arms 34, 36 and in particular pins 149A, 149B such that the pins 149A, 149B exit the notches 147A, 147B, thereby releasing the arms 34, 36 from the locking plate 144', allowing the arms 34, 36 to move freely. Hence, in this embodiment, the fixing assembly 140' automatically releases or holds the arms 34, 36 with movement of the control arm 66' rather than requiring a separate step of unlocking or locking the fixing assembly as is performed with fixing assembly 140. It should be noted that if desired the locking plate 144' can be configured so as to extend along side the exterior surfaces of the extension arms 34 and 36 rather than into apertures 153A, 153B. It also should be noted that, if desired, the locking plate 144' can be joined to the control arm 66' so as to be selectively movable with respect to the control arm 66', for example, being slidable linearly on the control arm 66' and/or be pivotally connected to the control arm 66' if it is desirable to have a separate operation or step in addition or in the alternative to moving the control arm 66' in order to unlock or lock the locking plate 144' with the extension arms 34, 36.

The embodiment of FIGS. 11-13 also shows a coupling assembly 62' having a variant of a connecting member 76' couples the flexure members 88 to the extension arms 34 and 36. In this embodiment, the connecting member 76' is not H-shaped but rather rectangular having an aperture 76A' though which both extension arms 34 and 36 extend. Pivot connections 78 pivotally connect the connecting member 76' to each of the arms 34 and 36 as well as connect the connecting member 76' to the force generating assembly 60 at flexure mounting block 80. In this embodiment though, a single link 100' joins the flexure mounting blocks 80 on each side of the force generating assembly 60 together.

Similar to the fixing assembly 140, the fixing assembly 140' holds the extension arms 34, 36 rigidly with the desired spacing until the specimen engaging devices 58 can engage the test specimen. After engagement has occurred, the fixing assembly 140' is in effect operated to release the arms 34, 36. The locking plate 144' with the notches 147A, 147B helps to support serves as a reference device so that the arms 34, 36 are oriented the same relative to the connecting member 76', in one preferable embodiment, where the arms 34 and 36 are parallel to each other.

Figure 14:
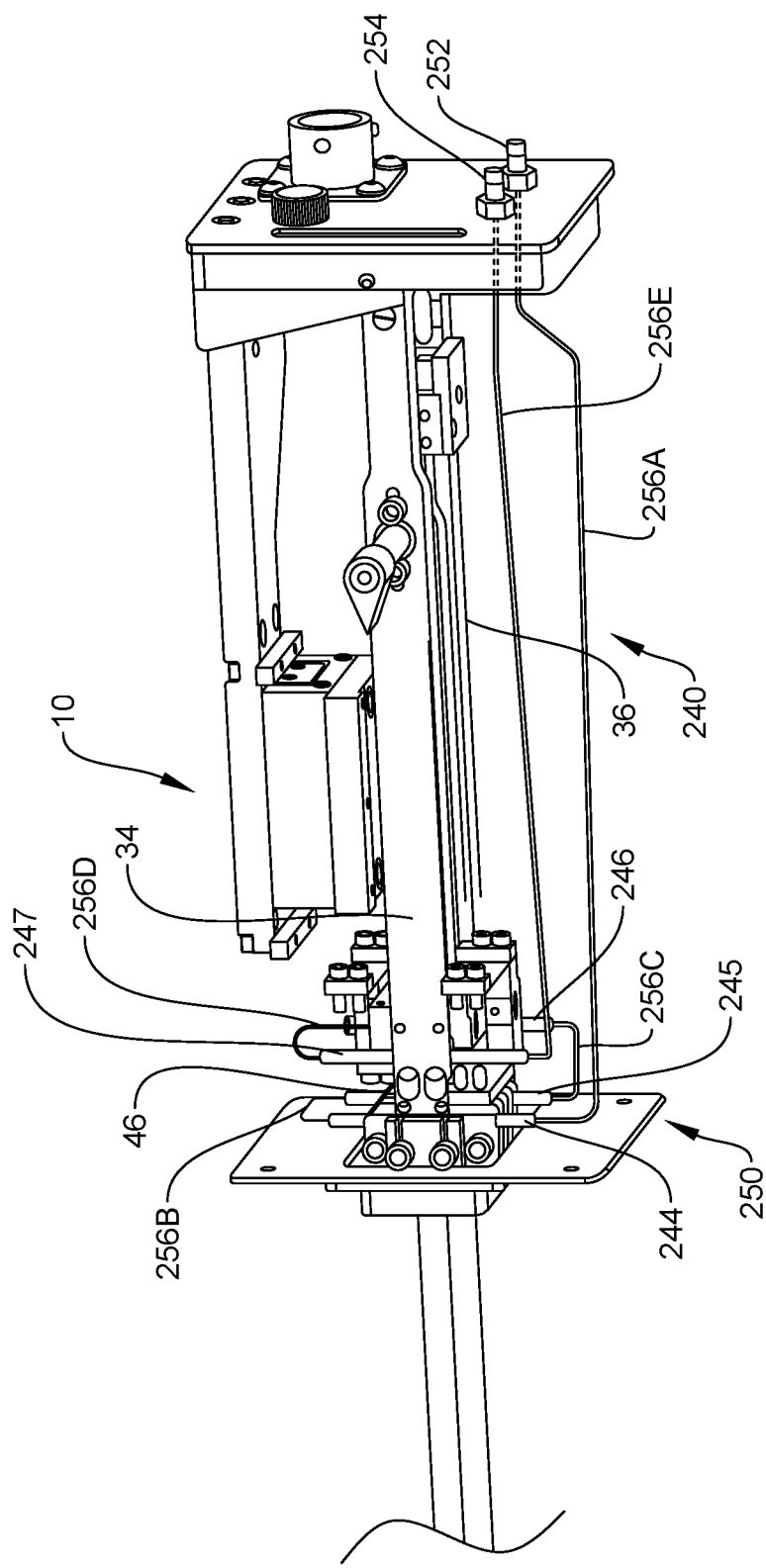
FIG. 14 is a perspective view of an extensometer with cooling lines.

It is often desirable to use an extensometer to take measurements of a test specimen when the test specimen is located in an environmental chamber. FIGS. 14 and 15 illustrate other aspects for an extensometer (such as extensometer 10 described above and illustrated in FIGS. 14 and 15 again by way of example) that enable the extensometer to be advantageously used with environmental test chambers. A cooling assembly or system 240 is provided to cool the mounts 44, 46 and ends of the extension arms 34 and 36 closest to the mounts 44, 46. As illustrated, each of the mounts 44, 46 and ends of the extensions arms 34, 36 are provided with a coolant passageway here embodied as coolant tubes 244, 245, 246 and 247. In one embodiment, the coolant passageways or tubes 244-247 are configured so as to extend transversely through the mounts 44, 46 and the ends and the extension arms 34, 36 relative to the axis of elongation of the extensive arms 34, 36. Fluid coolant lines, indicated generally at 250, fluidly couple an inlet port 252 and an outlet port 254 to the coolant tubes 244-247. In the embodiment illustrated, a first coolant line 256A connects the inlet port 252 to coolant tube 244. A second coolant line 256B fluidly couples coolant tube 244 to coolant tube 245. A third coolant line 256C fluidly connects coolant tube 245 to coolant tube 246. A fourth coolant 256D line fluidly connects coolant tube 246D to coolant tube 247. A fifth coolant line 256E connects coolant tube 247 to the outlet port 254. In the illustrated embodiment, the coolest coolant fluid is first provided to the coolant tubes 244 and 245 in the mounts 44, 46 since the mounts 44, 46 are closest to the heat of the environmental chamber; however, the configuration illustrated in FIG. 15 should not be considered limiting in that the coolant tubes can receive coolant fluid in any convenient manner. In the embodiment illustrated, the coolant tubes 244-247 are connected in series; however, if desired, the coolant tubes 244-247 can be configured with coolant lines that effectively provide coolant fluid to each of the coolant tubes 244-247 at the same time, i.e., where the coolant tubes 244-247 are fluidly connected in parallel.

Figure 15:
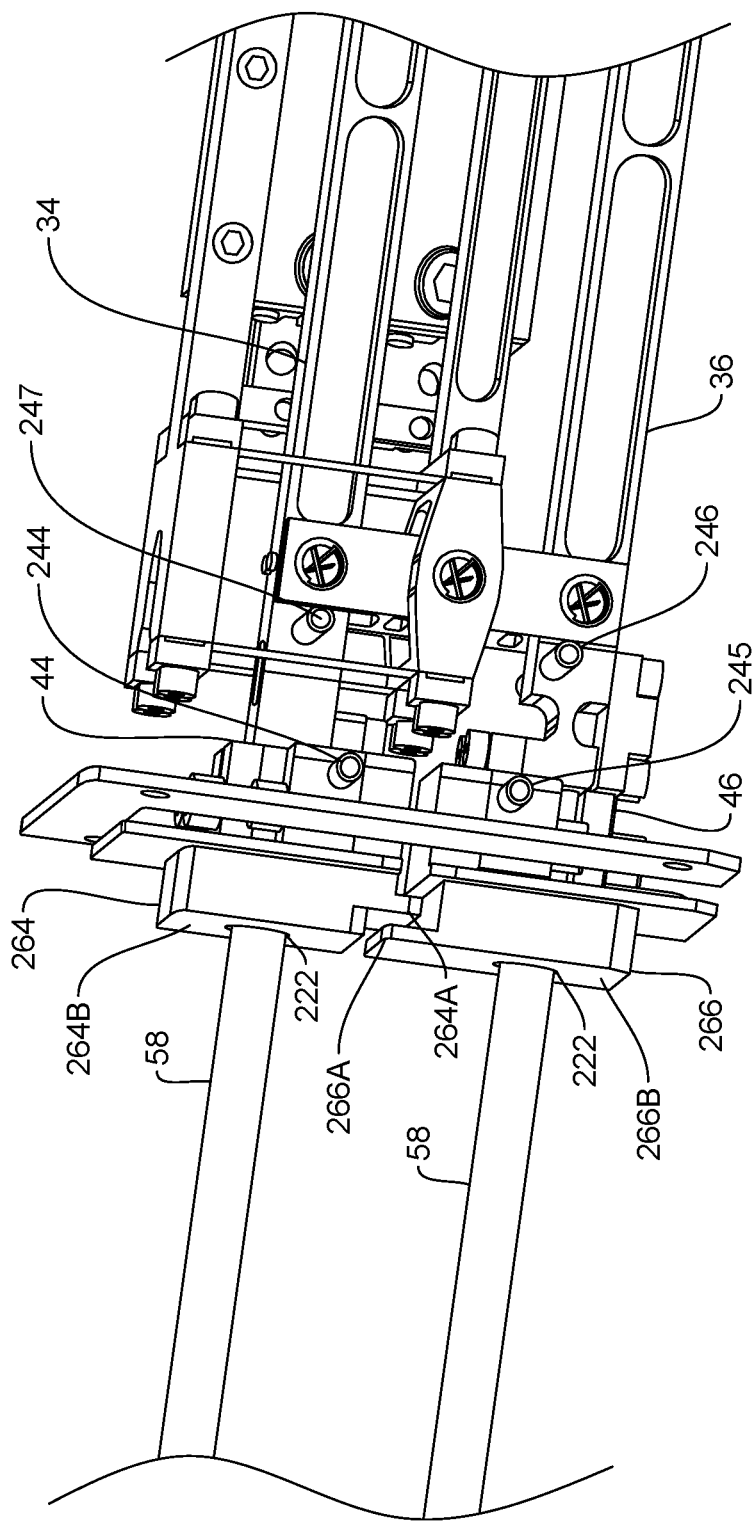
FIG. 15 is a partial perspective view of an extensometer with counterweight heat shields.

Referring to FIG. 15, heat radiation shields 264, 266 are joined to the mounts 44, 46, respectively. The shields 264, 266 shield the mounts 44, 46 and the other components of the extensometer 10 from the radiating heat of the environmental chamber. However, in this embodiment the shields 264, 266 are also functioned as counter weights on each of the extension arms 34, 36 so as offset at least some of the mass present on each arm 34, 36 on the other side of the connecting member 76 to which the arms 34, 36 are pivotally connected. In a preferred embodiment, the mass of each of the counter weights 264, 266 is chosen so as to substantially approximate most if not all the mass present on each of the arms 34, 36 to which each is attached. In this manner, the counter weights 264, 266 make the arms 34, 36 pivotally neutral which can makes the extensometer more sensitive. If a flexure assembly such as but not limited to a cross flexure assembly is connected to the arms 34, 36 on a side of the connecting member 76 opposite the counter weights 264, 266, the amount of flexure in the flexure assembly is minimized if the counter weights 264, 266 are present and approximate the mass of each arm 34, 36 on the other side of the connecting member 76. Likewise, if non-contact sensing devices such as capacitive or optical sensors are used on the arms 34, 36 on the other side of the connecting member 76, the counter weights 264, 266 can be configured to offset the mass of these components. The counter weights 264, 266 can be secured to the corresponding mounts 44, 46 with suitable fasteners such as threaded screws, not shown.

In the embodiment illustrated, the specimen engaging devices 58 extend through associated apertures 272 provided in each of the counter weights 264, 266. Such a configuration where the specimen engaging device extends through the aperture 272 is particularly convenient when the counter weights 264, 266 also function as heat shields; however, if such a function is not necessary, the counter weights 264, 266 can be of any other convenient shape. If the counter weights 264, 266 do function as heat shields, each of the counter weights 264, 266 preferably includes an extending flange 264A, 266A which overlap each other in a spaced apart relationship when the counter weights 264, 266 are mounted to the mounts 44, 46. In this manner, heat radiating from the environmental chamber is blocked by the overlapping flanges 264A, 266A. In one embodiment, surfaces facing or otherwise exposed to radiating heat energy, such as surfaces 264B, 266B are polished or otherwise reflective so as to reflect radiating heat energy away from the counter weights 264, 266.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. An extensometer structure comprising:
   a first extension arm having a first mount configured to support a first specimen engaging member;
   a second extension arm having a second mount configured to support a second specimen engaging member;
   a connecting member extending between the first and second extension arms and pivotally connected to the first extension arm with a first pivot connection and pivotally connected to the second extension arm with a second pivot connection, and wherein the first and second pivot connections are disposed on each respective extension arm between each corresponding mount on each respective extension arm and a remote end of each respective extension arm; and
   a rear coupling assembly connecting remote ends of the extension arms together.

2. The extensometer structure of claim 1 wherein the rear coupling assembly comprises at least one coupling link and a pivoting assembly connected in series to the remote ends of the first extension arm and the second extension arm.

3. The extensometer structure of claim 2 wherein the at least one coupling link and pivoting assembly comprises the at least one coupling link connected to the remote end of the first extension arm and the pivoting assembly comprising a first portion connected to the remote end of the second extension arm and a second portion pivoting relative to the first portion and connected to the at least one coupling link on an end opposite the end connected to the first extension arm.

4. The extensometer structure of claim 3 wherein the at least one coupling link comprises a flexure.

5. The extensometer structure of claim 4 wherein the pivoting assembly comprises a cross-flexure assembly.

6. The extensometer structure of claim 5 wherein the second pivot connection, a pivot axis of the cross-flexure assembly, and a pivot connection between the second extension arm and the connecting member are in a common line with each other.

7. The extensometer structure of claim 6 wherein a spacing between the first and second pivot connections is approximately equal to a spacing of pivot connections connecting the first and second extension arms to the connecting member.

8. The extensometer structure of claim 3 wherein the at least one coupling link comprises a rigid link having a first pivot connection connected to the first extension arm and a second pivot connection connected to the second portion of the pivoting assembly.

9. The extensometer structure of claim 2 and a fixing assembly having a movable locking member configured to engage each of the extension arms and selectively hold the extension arms in a fixed position relative to each other.

10. The extensometer structure of claim 9 wherein the fixing assembly is disposed between the connecting member and the at least one coupling link.

11. The extensometer structure of claim 1 and further comprising a force generating assembly coupled to the extensometer arms having a spring element to urge the extension arms toward a test specimen.

12. The extensometer structure claim 11 wherein the spring element is connected to the connecting member.

13. The extensometer structure of claim 12 wherein the connecting member comprises an H shaped member with upper free ends pivotally connected to the first extension arm and lower free ends pivotally connected to the second extension arm, the H shaped member having a center portion disposed between the first and second extension arms.

14. The extensometer structure of claim 13 wherein the spring element comprises a first spring element on a first side of the extension arms and a second spring element on a second side of the extension arms.

15. The extensometer structure of claim 14 wherein the force generating assembly further comprises a movable mounting block pivotally connected to the connecting member, each of the spring elements joined to the movable mounting block.

16. The extensometer structure of claim 15 wherein each of the spring elements comprise a flexure.

17. The extensometer structure of claim 15 wherein each of the spring elements comprise a pair of parallel flexures.

18. The extensometer structure of claim 1 wherein each mount and associated end of each extension arm includes a coolant passageway.

19. An extensometer structure comprising:
   a first extension arm;
   a second extension arm movably connected to the first extension arm; and
   a fixing assembly coupled to each of the first extension arm and the second extension arm configured to selectively secure the first extension arm to the second extension arm together to inhibit movement of the first and second extension arms toward and away from each other.

20. The extensometer structure of claim 19 wherein the fixing assembly comprises a locking member that pivots or rotates with respect to at least one of the extension arms.

21. The extensometer structure of claim 20 wherein the fixing assembly comprises a rotatable shaft extending through the first extension arm and the second extension arm.

22. The extensometer structure of claim 21 wherein the fixing assembly includes:
   a first cam secured to the shaft to rotate therewith, the first cam selectively engagable with the first extension arm; and a second cam secured to the shaft to rotate therewith, the second cam selectively engagable with the second extension arm.

23. The extensometer structure of claim 22 wherein the first extension arm includes a first aperture and the second extension arm includes a second aperture, the rotatable shaft extending through the first aperture and the first aperture, the first cam being disposed in the first aperture and the second cam being disposed in the second aperture.

24. The extensometer structure of claim 19 wherein the fixing assembly includes a locking member configured to selectively engage at least one of the extension arms.

25. The extensometer structure of claim 19 wherein the fixing assembly comprises a locking plate including portions that releasably engage portions of each of the extension arms.

26. The extensometer structure of claim 25 wherein the locking plate extends through an aperture provided in each of the extension arms.

27. An extensometer structure comprising:
a mounting assembly having a first mounting block movable relative to a second mounting block;
an extensometer arm assembly joined to the second mounting block and including:
a first extension arm; and
a second extension arm movably connected to the first extension arm; and
a force generating assembly coupled to the extensometer structure with a spring element to urge the extension arms toward a test specimen.

28. The extensometer structure of claim 27 wherein the force generating assembly includes a control element wherein the control element is joined to the spring element, the control element movable relative to a stationary member.

29. The extensometer structure of claim 28 wherein the locking plate moves with the control element.

30. The extensometer structure of claim 28 wherein the locking plate moves relative to the control element.

31. The extensometer structure of claim 28 and further comprising a user adjustable driver connected to the control element to adjust a position of the control element relative to the stationary member.

32. The extensometer structure of claim 31 wherein the user adjustable driver comprises a rotatable threaded member configured to adjust the position of the control element relative to the stationary member.

33. The extensometer structure of claim 32 wherein the user adjustable driver comprises a movable block slidably engaging the control element.

34. The extensometer structure of claim 33 wherein the movable block in slidable in the stationary member.

35. The extensometer structure of claim 34 wherein the movable block is movable relative to the stationary member to any of a plurality repeatable positions.

36. The extensometer structure of claim 35 and further comprising a scale indicating each position of the plurality of repeatable positions.

37. The extensometer structure of claim 34 and further comprising a fixing device to selectively fix the movable block to the stationary member.

38. The extensometer structure of claim 33 wherein the movable block has a variable width between sliding engagement with the control element and the stationary member.

39. An extensometer structure comprising:
a first extension arm having a first mount configured to support a first specimen engaging member;
a second extension arm having a second mount configured to support a second specimen engaging member;
a connecting member pivotally connected to each of the extension arms;
a first counter weight mounted to the first extension arm on a first side of the connecting member, the first counter weight of mass to offset at least some of the mass present on the first extension arm on a second side of the connecting member opposite the first counter weight; and
a second counter weight mounted to the second extension arm on the first side of the connecting member, the second counter weight of mass to offset at least some of the mass present on the second extension arm on the second side of the connecting member opposite the second counter weight.

40. The extensometer structure of claim 39 and further comprising a mount connected to each end of arm, each mount configured to hold a test specimen engaging member, each of the counter weights being secured to each corresponding mount.

41. The extensometer structure of claim 40 wherein each counter weight includes an aperture through which a test specimen engaging member mounted to each associated mount can extend therethrough.

42. The extensometer structure of claim 40 wherein each counter weight includes an extending flange, wherein the extending flanges overlap each other in a spaced apart relationship.

43. The extensometer structure of claim 39 wherein each counter weight includes an extending flange, wherein the extending flanges overlap each other in a spaced apart relationship.

44. The extensometer structure of claim 39 wherein each counter weight includes a reflective outer surface to reflect heat energy.

45. The extensometer structure of claim 1 and further comprising:
a first counter weight mounted to the first extension arm on a first side of the connecting member, the first counter weight of mass to offset at least some of the mass present on the first extension arm on a second side of the connecting member opposite the first counter weight; and
a second counter weight mounted to the second extension arm on the first side of the connecting member, the second counter weight of mass to offset at least some of the mass present on the second extension arm on the second side of the connecting member opposite the second counter weight.

46. An extensometer structure comprising:
a first extension arm;
a second extension arm movably connected to the first extension arm;
a first mount connected to an end of the first extension arm and configured to hold a first specimen engaging device;
a second mount connected to an end of the second extension arm and configured to hold a second specimen engaging device; and
wherein each mount and associated end of each extension arm includes a coolant passageway.

47. The extensometer structure of claim 46 wherein each passageway comprises a coolant tube.

48. The extensometer structure of claim 47 and a plurality of coolant lines fluidly connecting each of the passageways to an inlet port and outlet port.

49. The extensometer structure of claim 48 wherein the passageways are connected in series with each other and the inlet and outlet ports.

\* \* \* \* \*